Aug. 19, 1941.  J. G. ALTHER  2,253,007
PROCESS FOR THE CONVERSION OF HYDROCARBONS
Filed Oct. 27, 1939
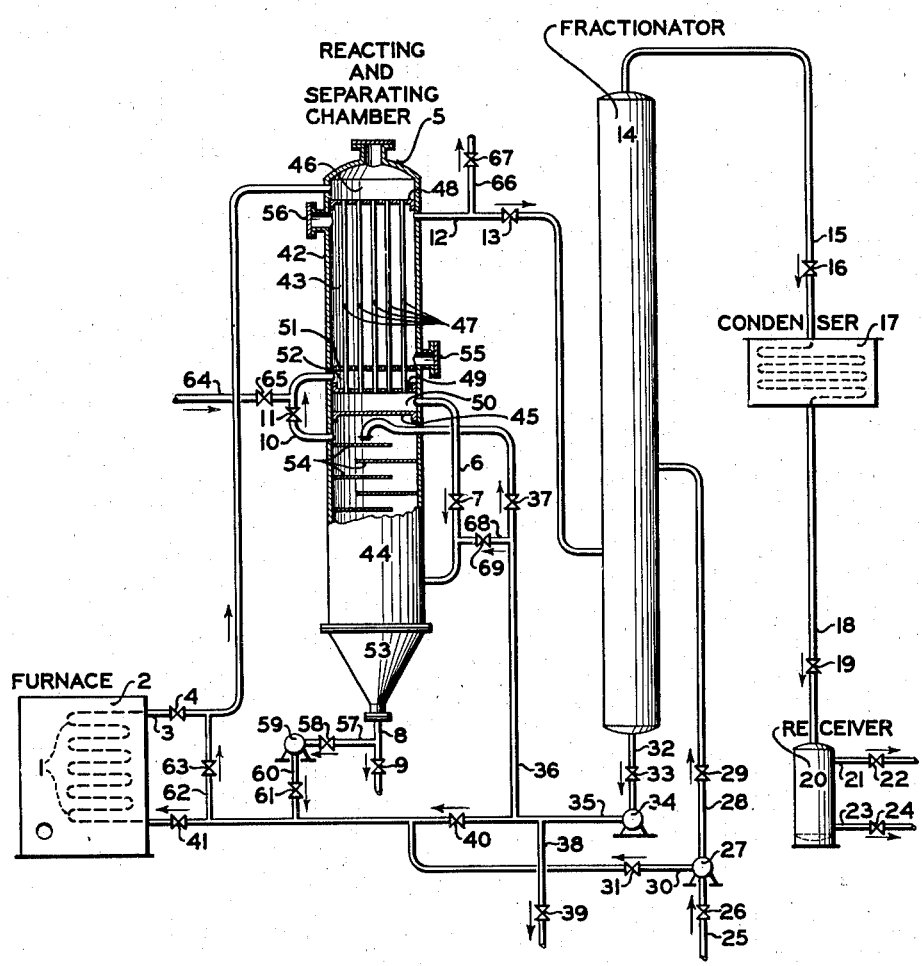
INVENTOR
JOSEPH G. ALTHER
BY
ATTORNEY Patented Aug. 19, 1941

2,253,007

UNITED STATES PATENT OFFICE 2,253,007

PROCESS FOR THE CONVERSION OF HYDROCARBONS

Joseph G. Alther, Chicago, Ill., assignor to Universal Oil Products Company, Chicago, Ill., a corporation of Delaware Application October 27, 1939, Serial No. 301,554

6 Claims. (Cl. 196—52)

This invention relates to a process for the conversion of hydrocarbons and more specifically to a process for the catalytic conversion of normally liquid hydrocarbons into more valuable materials and specifically gasoline.

Various forms of apparatus have been developed in the past for use as contact vessels in catalytic endothermic reactions. In the majority of cases, an extraneous material, such as combustion gases or some other suitable fluid medium, has been used as the heat convective medium to supply the necessary heat of conversion to the hydrocarbons being converted. Certain disadvantages, however, attend this type of operation which render it uneconomical, largely from the standpoint that expensive heat exchange equipment is necessary to recover waste heat in the process. In addition, combustion gases which are commonly used, are a relatively poor heat convective medium because of their poor heat transfer properties and are further undesirable because of the high temperatures which must be employed. Other fluid mediums which have been employed consist of materials which are solid under atmospheric conditions, and hence provisions must be made in these cases for supplying heat to the various transfer lines to prevent solidification of the medium therein.

In my process I propose to utilize the heated charging stock and, when desired, intermediate conversion products as the heat convective medium in supplying the heat of conversion to the vaporous materials separated therefrom while they are in contact with the catalyst. To accomplish the object of my invention, I prefer to employ the single chamber as the reacting and separating zone which, in its simplest form, involves a chamber containing the catalyst zone in its upper portion with tubes embedded in the catalyst through which the heated materials are passed. The lower portion of the chamber may serve as a separating zone to which the heated oil, after losing at least some of its heat in the catalyst zone, is supplied and separated into vaporous and liquid fractions and the vaporous fraction subjected to contact with the catalyst in the upper portion of the chamber. It is to be understood, however, that the invention is not limited in this respect, for I may, if so desired, employ two separate chambers, one as the reactor and the other as the separating chamber.

In one specific embodiment the invention comprises heating a hydrocarbon oil to a cracking temperature, passing the resulting heated material in indirect heat exchange relationship with catalyst and vapors, the latter undergoing conversion in contact with said catalyst, to supply the heat of conversion, separating the resulting oil of a lower heat content into a vaporous fraction and a non-vaporous liquid residue fraction and recovering the latter, supplying said vapors as the vapors to be converted in contact with said catalyst, fractionating the resulting conversion products to separate fractionated vapors boiling in the range of gasoline from the higher boiling hydrocarbons and condensing the latter as reflux condensate, commingling said reflux condensate with charging oil and supplying it as the hydrocarbon oil for heating, as hereinbefore set forth, cooling and condensing said fractionated vapors and recovering the resulting distillate and gas as products of the process.

The accompanying drawing illustrates diagrammatically in conventional side elevation one specific form of the process which may be used to accomplish the objects of the invention. In addition, part of the reacting and separating chamber is shown in cross-section to illustrate one form of apparatus which may be employed.

Referring now to the drawing, either charging oil alone or in admixture with reflux condensate, formed as hereinafter described, is introduced to heating coil 1, by means to be described more fully later. The oil in passing through heating coil 1 is raised to a temperature, preferably in excess of that at which catalytic cracking is effected with or without substantial pyrolytic cracking being effected, and this temperature may range, for example, from 800 to 1200° F., heat being supplied from furnace 2. The heated oil in leaving heating coil 1 is directed through line 3 and valve 4 into the upper portion of reacting and separating chamber 5, a detailed description of which will be given more fully later.

The heated oil passes downwardly through a plurality of tubes embedded in the catalyst zone, the latter forming the upper portion of chamber 5, and in doing so supplies the heat of conversion to the vapors being contacted with the catalyst which surrounds the tubes. The oil after losing some of its heat, as above described, collects in a gathering zone from which it is conducted by means of line 6 through valve 7 into the separating zone of chamber 5 where the vaporous and non-vaporous liquid residue fractions are separated. A suitable cooling oil, such as reflux condensate, formed as hereinafter described, may be commingled with the oil in line 6 prior to its introduction into the separating zone, by means to be described later, in order to cool the materials to a temperature at which separation may be effected. The non-vaporous liquid residue fraction is removed from the separating zone of chamber 5 by way of line 8 and valve 9 and recovered as a product of the process or subjected to any desired further treatment. The vaporous fraction, preferably after being cooled by commingling therewith a portion of the reflux condensate formed and introduced as hereinafter described, and preferably also after rough fractionation to remove carbonaceous substances, is conducted from the upper portion of the separating zone through line 10 and valve 11 into a distributing zone below the catalyst bed. The vapors pass through a perforated plate which supports the catalyst bed, in the case here illustrated, and are subjected to conversion at a cracking temperature and pressure, heat being supplied as previously described.

The preferred cracking catalysts for use in the present process consist in general of a precipitated alumina hydrogen and/or zirconia hydrogel composited with silica hydrogel, the gel composite being washed, dried, formed into particles, and calcined to produce a catalyst mass. The invention, however, is not limited to these particular catalysts, for other catalysts, such as, for example, the hydrosilicates of alumina, acid treated clays, and the like, may be used within the broad scope of the invention.

In the following specification and claims the terms silica-alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia are deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of alumina and/or zirconium salts and an alkaline precipitant, such as ammonium hydroxide, ammonium carbonate or ammonium sulfide, added to the solution to precipitate aluminum and/or zirconium hydrogels. The final precipitate, comprising essentially hydrated silica and hydrated alumina and/or zirconia, is washed to substantially completely remove water soluble materials and dried at about 300° F. to produce a rather crumbly and granular material which may be ground and pelleted or sized to produce particles of catalyst after which the catalyst particles are calcined at a temperature in the approximate range of 1000 to 1500° F. Various other procedures, such as, for example, co-precipitation of the hydrated gels may be employed, when desired, to produce the preferred catalyst. Temperatures on the order of 800 to 1200° F. and pressures ranging, for example, from substantially atmospheric to 200 pounds or more per square inch superatmospheric may be employed when using the preferred catalyst.

The conversion products, in the case here illustrated, are removed from the upper portion of the catalyst zone. However, when desired, the vapors introduced to the catalyst zone may be introduced above the catalyst bed, in which case the conversion products would be removed from the lower portion of the catalyst zone. In any case, the conversion products are directed through line 12 and valve 13 into fractionator 14 which is preferably operated at substantially the same pressure as that employed on the outlet of the catalyst zone.

The vaporous conversion products in fractionator 14 are fractionated therein to separate fractionated vapors boiling in the range of gasoline from the higher boiling hydrocarbons and the latter condensed as reflux condensate. Fractionated vapors separated in fractionator 14 are directed through line 15 and valve 16 to cooling and condensation in condenser 17. Distillate, together with undissolved and uncondensed gases in condenser 17, is directed through line 18 and valve 19 to collection and separation in receiver 20. Normally gaseous hydrocarbons collected and separated in receiver 20 are removed from the upper portion thereof by way of line 21 and valve 22 and recovered as a product of the process or subjected to any desired further treatment. A portion of the distillate collected and separated in receiver 20 may be returned to the upper portion of fractionator 14, by well known means not shown, for use as a refluxing and cooling medium. The residual portion of the distillate in receiver 20 is removed therefrom by way of line 23 and valve 24 and recovered as a product of the process or subjected to any desired further treatment.

Charging oil for the process is introduced through line 25 and valve 26 to pump 27. Pump 27 discharges through line 28, and when the charging oil contains hydrocarbons boiling in the range of gasoline it may be directed through valve 29 into fractionator 14 for fractionation therein in commingled state with the vaporous conversion products, introduced as previously described, in which case, hydrocarbons boiling above gasoline may be collected along with the reflux condensate. However, when the charging oil contains no hydrocarbons boiling in the range of gasoline, it may be directed through line 30 and valve 31 into line 35 by means of which it is conveyed either alone or in commingled state with reflux condensate through valve 41 into heating coil 1.

Reflux condensate, formed as previously described, is removed from fractionator 14 by way of line 32 and is directed through valve 33 to pump 34. Pump 34 discharges through line 35 and a portion of the reflux condensate is preferably conducted through line 36 and valve 37 into the upper portion of the separating zone in chamber 5 to serve as a refluxing and cooling medium. When desired, a portion of the reflux condensate in line 36 may be directed through line 68 and valve 69 into line 6 for use as previously described. The residual portion of the reflux condensate in line 35, when only charging oil is introduced to heating coil 1, may be recovered from the process by way of line 38 and valve 39. Preferably, however, either all or a portion of the reflux condensate not employed as the cooling medium, as previously described, is directed through valve 40, after which it is commingled with charging oil, and the mixture directed through valve 41 into heating coil 1. On the other hand, when all of the charging oil is introduced to fractionator 14, all of the material in line 35, which includes both the heavy fraction of the charging oil and the reflux condensate, not used as the cooling medium in the separating zone of chamber 5, is directed through valves 40 and 41 into heating coil 1, for treatment as previously described.

With reference now to the description of chamber 5. Chamber 5 preferably comprises a cylindrical vessel 42, the upper portion of which is an enclosed zone 43 which serves as a reactor zone and the lower portion of which serves as a separating zone 44, the two zones being separated by a solid partition 45.

Reactor zone 43 contains an upper distributing zone 46 to which the heated incoming oil is supplied. The heated incoming oil passes downwardly through tubes 47 which are rolled into tube sheets 48 and 49. The oil after losing some of its heat in passing through tubes 47 is collected in zone 50 from which it is conducted, as previously described. Tubes 47 are embedded in catalyst which is supported by means of a perforated plate 51. Vapors to be converted are supplied to distributing zone 52 formed by means of tube sheet 49 and perforated plate 51. Vapors pass through perforated plate 51 into the catalyst zone which surrounds tubes 47, and the conversion products which collect above the catalyst bed are conducted therefrom, as previously described.

Separating zone 44 is preferably provided with a cone shaped bottom head 53 in order that the quantity of liquid residue retained within the separating zone to maintain a liquid level is relatively small to prevent excessive low temperature thermal cracking and carbon formation. In addition, separating zone 44 is preferably provided with perforated pans or bubble decks 54 which serve as a means for cleaning up the vapors and preventing entrainment of carbonaceous substances with the vapors supplied to the catalyst zone. Chamber 5 may also be equipped with manholes 55 and 56 through which catalyst may be removed from and supplied to zone 43, respectively. It is, of course, understood that the apparatus herein described is only one of many forms of apparatus which may be used in successfully carrying out the process of the invention. Catalyst zone 43 and separating zone 44 may, for example, be confined within separate chambers, the flow of the hydrocarbons, however, remaining substantially as described.

Since the catalytic conversion reaction must, by necessity, be periodic because of the formation of carbonaceous substances upon the surface and within the pores of the catalyst, which reduces its activity requiring regeneration to restore the catalyst to its active state, a plurality of reacting and separating chambers are preferably employed in order that the operation may be made continuous. On the other hand, when a catalyst is employed which does not require frequent regeneration, only one reacting and separating chamber may be employed and operation discontinued during the time the catalyst is being reactivated.

Regeneration of the catalyst may be accomplished in the following manner: When the activity of the catalyst has become considerably reduced, the fire in furnace 2 may be cut or only lowered during which time cooling oil is circulated through tubes 47 in zone 43. The cooling oil may comprise, for example, portions of the oil to be converted, in which case, since little or no vaporization takes place in zone 44, all of the oil is removed therefrom by way of line 8 and directed through line 57 and valve 58 into pump 59, which discharges through line 60 and valve 61 into line 35. Cooling oil in line 35 with cooling in a heat exchanger, not shown, or without cooling, is directed through line 62 and valve 63 into line 3, by means of which it is conducted into zone 46, the flow thereafter being substantially the same as that of the heating oil. However, when heat is required to initiate or maintain the combustion taking place in the catalyst zone, the cooling oil in line 35 may be passed through heating coil 1 in the manner described, and thereafter supplied to tubes 47 by way of line 3, valve 4, and distributing zone 46.

At the same time, reactivating gases, comprising an inert gas containing controlled amounts of oxygen, are introduced through line 64 and valve 65 into zone 52. Reactivating gases are thereafter contacted with the catalyst in zone 43, removing the carbonaceous substances by combustion thereof, and the combustion gases, together with the reactivating gases, are removed by way of line 12 and directed through line 66 and valve 67, a portion of which may be returned as the inert portion of the reactivating gases to the inlet, or all may be disposed of as desired.

An example of one specific operation of the process as it may be accomplished in an apparatus such as illustrated and above described is approximately as follows:

Charging oil comprising a 36° A. P. I. gravity Mid-Continent gas oil together with reflux condensate, formed as hereinafter described, was heated to a temperature of approximately 1050° F. and at a superatmospheric pressure of 90 pounds per square inch. The heated material was passed through the tubes embedded in the catalyst imparting heat to the latter and to vapors in contact therewith.

The hydrocarbon materials leaving the tubes embedded in the catalyst at a temperature of approximately 950° F. were introduced to a separating zone operated at a superatmospheric pressure of 60 pounds per square inch where the vapors were separated from the non-vaporous liquid residue and the latter recovered as a product of the process. A portion of the reflux condensate, formed as hereinafter described, was introduced to the upper portion of the separating zone as a cooling and refluxing medium and to aid in removing carbonaceous substances from the vapors. The vapors leaving the upper portion of the separating zone at a temperature of approximately 900° F. were supplied to the catalyst zone to which heat was imparted, as aforesaid, and contacted with a silica-alumina-zirconia catalyst.

The conversion products from the catalyst zone were fractionated to separate fractionated vapors boiling in the range of gasoline from the higher boiling hydrocarbons and the latter condensed as reflux condensate. The fractionated vapors were subjected to cooling and condensation and the resulting distillate and gas collected as products of the process. A portion of the reflux condensate was supplied to the separating zone, as previously mentioned, and the residual portion thereof commingled with charging oil and subjected to heating, as previously described.

The yield from this operation was approximately 65% of 400 end point gasoline having an octane number of 79, 11.5% of 16° A. P. I. gravity liquid residue, the balance being normally gaseous hydrocarbons and loss. The normally gaseous hydrocarbons formed in the process contained a high percentage of polymerizable olefins.

I claim as my invention:

1. In the catalytic conversion of hydrocarbon oil wherein hydrocarbon vapors are contacted with a cracking catalyst in a reaction zone maintained at cracking temperature, the method which comprises passing hydrocarbon oil through a heating zone independent of said reaction zone and heating the same therein to cracking temperature, then passing the heated oil in indirect heat exchange with the vapors and catalyst in the reaction zone, thereafter removing the oil from heat exchange relation with the vapors and catalyst in the reaction zone and separating the same into vaporous hydrocarbons and residue, and introducing said vaporous hydrocarbons into the reaction zone for catalytic conversion therein.

2. In the catalytic conversion of hydrocarbon oil wherein hydrocarbon vapors are contacted with a cracking catalyst in a reaction zone maintained at cracking temperature, the method which comprises passing hydrocarbon oil through a heating zone independent of said reaction zone and heating the same therein to cracking temperature, then passing the heated oil in indirect heat exchange with the vapors and catalyst in the reaction zone, thereafter removing the oil from heat exchange relation with the vapors and catalyst in the reaction zone and separating the same into vaporous hydrocarbons and residue, and introducing said vaporous hydrocarbons into the reaction zone for catalytic conversion therein, fractionating the vaporous products from the reaction zone to condense heavier fractions thereof, and supplying resultant reflux condensate to the heating zone as at least a part of said hydrocarbon oil.

3. In the catalytic conversion of hydrocarbon oil wherein hydrocarbon vapors are contacted with a cracking catalyst in a reaction zone maintained at cracking temperature, the method which comprises passing hydrocarbon oil through a heating zone independent of said reaction zone and heating the same therein to cracking temperature, then passing the heated oil in indirect heat exchange with the vapors and catalyst in the reaction zone, thereafter removing the oil from heat exchange relation with the vapors and catalyst in the reaction zone and separating the same into vaporous hydrocarbons and residue, and introducing said vaporous hydrocarbons into the reaction zone for catalytic conversion therein, fractionating the vaporous products from the reaction zone to condense heavier fractions thereof, combining resultant reflux condensate with charging oil for the process and supplying the mixture to said heating zone.

4. The method as defined in claim 1 further characterized in that a cooling oil is commingled with said heated oil intermediate the heat exchange step and the separating step.

5. The method as defined in claim 1 further characterized in that the vaporous hydrocarbons liberated in the separating step are refluxed to separate carbonaceous substances before supplying the vapors to the reaction zone.

6. A conversion process which comprises cracking hydrocarbon vapors in contact with a cracking catalyst, simultaneously heating hydrocarbon oil to cracking temperature and passing the same in indirect heat exchange with said vapors and catalyst to supply heat for the endothermic cracking reaction, separating vapors from said oil following the heat exchange step and supplying vapors thus separated to the catalytic cracking step.

JOSEPH G. ALTHER.